United States Patent Office 3,277,021
Patented Oct. 4, 1966

3,277,021
PROCESS FOR THE POLYMERIZATION OF 1,2-ALKYLENE OXIDES USING A TANTALUM COMPOUND AS CATALYST
Gustav Daendliker, Birsfelden, Switzerland, assignor to Ciba Limited, Basel, Switzerland, a Swiss company
No Drawing. Filed July 11, 1962, Ser. No. 209,214
Claims priority, application Switzerland, July 14, 1961, 8,268/61
8 Claims. (Cl. 260—2)

The polymerization of 1,2-alkylene oxides leading to polyalkylene oxides is known. A variety of catalysts has already been proposed for this reaction, namely metals such as sodium and potassium, inorganic bases such as potassium hydroxide, metal oxides such as zinc oxide, strontium oxide or calcium oxide, carbonates such as strontium carbonate, metal halides such as tin tetrachloride, metal-alkyl compounds such as aluminum triisobutyl and magnesium- and aluminum-alkoxides such as aluminum tertiary butoxide or aluminum diethoxy chloride (see, for example, A. M. Paquin, Epoxydverbindungen und Epoxyharze, 1958, pages 17 et seq.).

It has now been found that 1,2-alkylene oxides can be polymerized in a particularly simple and advantageous manner by working in the presence of an alcoholate or phenolate of tantalum. The present invention provides a process for the manufacture of polyalkylene oxides by catalytic polymerization of saturated 1,2-alkylene oxides, wherein the polymerization is performed with the aid of an alcoholate or phenolate of tantalum.

The process of the invention yields even under atmospheric pressure in a simple manner crystalline polyalkylene oxides having a high molecular weight ranging, for example, from 2,000 to 100,000. The present process further offers the advantage that it can be performed not only under atmospheric pressure or a slightly higher pressure, but also at relatively low temperatures ranging, for example, from 10 to 30° C. and within a time that is surprisingly short for the polymerization of 1,2-alkylene oxides; furthermore, there should also be mentioned the uniform and even progress of the process and the favorable yields obtained. It is another advantage of the present process that the process, catalysed by an alcoholate or phenolate of tantalum, represents a homogeneous catalysis so that there is no need to provide special apparatus to disperse the catalyst continuously within the reaction mixture.

A preferred modification of the process, when performed with ethylene oxide, is that the tantalum alcoholate or phenolate is used as a solution in liquid ethylene oxide and that the polymerisation is performed under atmospheric pressure and at a temperature below the boiling temperature of the resulting solution, preferably below the boiling point of ethylene oxide, that is to say below 10.8° C. Alternatively, the polymerization may be conducted under autogenous pressure and at a temperature below the boiling point of the resulting solution under the pressure used, more especially at 10.8 to 150° C., preferably at 10.8 to 80° C. The term "autogenous pressure" is used to indicate the pressure set up at a specific reaction temperature when the reactor is closed at the beginning of the reaction under atmospheric pressure. As a rule the autogenous pressure does not exceed 5 atmospheres (gauge). It is also of advantage to disperse the tantalum alcoholate or phenolate in ethylene oxide and in an inert solvent having a boiling point above 30° C., the polymerization being performed under atmospheric pressure and at a temperature not exceeding 30° C. Very good results are also obtained by dissolving or suspending the tantalum alcoholate or phenolate in an inert solvent and introducing ethylene oxide in the resulting solution or suspension under atmospheric or slightly higher pressure at a temperature ranging from 0 to 150° C.

Depending on the reaction conditions used—for example choice of temperature and amount of the metal alcoholate used—the present process yields liquid, highly viscous or solid products.

Solvents in which the metal alcoholates can be dissolved or dispersed for the reaction are, for example: benzene, a xylene, methylcyclohexane, or aliphatic hydrocarbons or mixtures thereof such, for example, as the product marketed by Shell Chemical Corp. under the trademark "Shellsol T"; furthermore chlorinated aliphatic hydrocarbons, ether and dioxane.

The alcoholates and phenolates, to be used in the present process, correspond to the general formula:

$$(Cl-)_{n-1}Ta(-O-R)_{6-n}$$

or, preferably, $$Ta(-O-R)_5$$

in which $n$ is a whole number from 1 to 5 and —O—R represents the monovalent radical, left upon removal of the hydrogen atom, of a monohydric alcohol or phenol which may be substituted. Suitable monohydric compounds are (1) Aliphatic (preferably saturated) primary, secondary and tertiary monoalcohols with 1 to 18 carbon atoms, including the saturated and unsaturated cycloaliphatic monoalcohols with 5 to 10 carbon atoms and the alkylarylalcohols with 7 to 8 carbon atoms, and (2) Monophenols with 6 to 10 carbon atoms: As examples there may be mentioned aliphatic alcohols such as methanol, ethanol, propanol, isopropanol, allyl alcohol, n-butanol, secondary and tertiary butanol, cyclopentanol, cyclohexanol, tetrahydrobenzyl alcohol, hexahydrobenzyl alcohol, dicyclopentanol or benzyl alcohol; halogen-substituted alcohols such as ethylene-chlorohydrin, 2-chloropropanol, 2-chloro-2-phenylethanol and the corresponding bromo- and iodo-compounds, and aromatic hydroxyl compounds such as phenol, cresol or naphthol. Particularly good results are achieved with secondary and tertiary alcohols.

The tantalum alcoholates and phenolates to be used in the present process can be manufactured by known methods, for example by reacting the bromide $TaBr_5$, or more especially the chloride $TaCl_5$, with an alkali-alkoxide or alkali-phenoxide, according to the scheme:

$$TaCl_5 + 5NaOR = Ta(OR)_5 + NaCl$$

or by reacting the selected tantalum halide with an alcohol or phenol and ammonia according to the scheme $$TaCl_5 + 5ROH + 5NH_3 = Ta(OR)_5 + 5NH_4Cl$$

or, in the case of the phenols, by direct reaction of the hydroxylated compound with the tantalum halide according to the scheme:

$$TaCl_5 + 5\text{-Aryl}-OH = Ta(-O\text{-Aryl})_5 + 5HCl$$

The metal alcoholates are also available by another process, namely the reaction of the bromide $TaBr_5$, or more especially the chloride $TaCl_5$, with an alkylene oxide, for example ethylene oxide, in the presence of an inert solvent. In this case the reaction takes the following course:

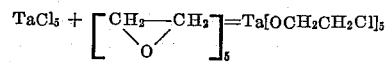

or

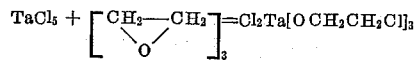

It is often of advantage to use mixed tantalum alcoholphenolates, for example such as contain three —O-aryl and two —O-alkyl radicals, as is the case with the compound Ta(—O—C₆H₅)₃(—O—CH₂CH₃)₂.

Alternatively, if desired, the catalytically active metal alcoholate may be formed immediately before or at the beginning of the polymerization of the alkylene oxide in the reactor itself from the appropriate tantalum halide, for example TaCl₅, and the alkylene oxide in situ.

As tantalum alcoholates there may be used in the present process also those of oligo or polyethyleneglycols such as are formed, for example, in the manufacture of tantalum alcoholates from tantalum halides and an excess of alkylene oxide. In this case, too, the desired tantalum alcoholate can be formed directly in the reactor used for the present polymerization immediately before or at the start of the polymerization of the alkylene oxide in situ.

As 1,2-alkylene oxides there are used those mono-epoxides of hydrocarbons or halogen-hydrocarbons which correspond to the general formula

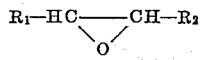

where $R_1$ and $R_2$ each represents hydrogen or a saturated hydrocarbon radical with 1 to 12 carbon atoms which may be halogen-substituted, or $R_1$ and $R_2$ together with the epoxycarbon atoms represent a saturated cyclo-aliphatic hydrocarbon radical containing 5 to 10 carbon atoms. As relevant examples there may be mentioned ethylene oxide, propylene oxide, epichlorohydrin, 1,2-epoxybutane, 2,3-epoxybutane, 1,2-epoxyhexane, 2,3-epoxyheptane, 1,2-epoxydodecane, styrene oxide, cyclopentene oxide, cyclohexene oxide and dicyclopentene monoxide. Ethylene oxide and propylene oxide, as well as their mixtures, are particularly suitable.

The alcoholates or phenolates to be used as catalysts in the present process are generally to be used in an amount of 0.01 to 20%, preferably of 0.1 to 10%, calculated from the total weight of the monomeric 1,2-alkylene oxides. It has been found to be of advantage to add water in the case of the phenolates; as a rule up to 1 molecular proportion of water per molecular proportion of phenolate may be added. The addition of water accelerates the polymerization.

In some cases part of the tantalum is simultaneously fused into the polymerization product; the recovery of this metal share fused into the polymer is a simple matter and may be achieved, for example, by treatment with an alkaline substance, such as concentrated ammonia.

The compounds obtained by the present process are distinguished by particularly valuable properties, for example with relation to their molecular weight, viscosity and solubility in water. They can be used with special advantage, for example, as thickeners in aqueous solutions, as water-soluble coats and coatings, as sizing agents, as mould lubricants, as additives to waxes and polishes and to galvanic baths; furthermore in cosmetics, for example as additive to nail varnishes or nail varnish removers and to lipsticks, and also in pharmacy as assistant and coating materials for the manufacture of tablets and dragees, and also as constituents of suppositories. The products of the present invention are, above all, suitable for the manufacture of water-soluble wrappings, for example of a pulverulent substance which is to be dissolved in water prior to its use.

In the following examples parts are by weight.

*Example 1*

(a) A solution of 52 grams of tantalum pentachloride in 400 ml. of methylcyclohexane is reacted under nitrogen at 10 to 20° C. with excess ethylene oxide while being stirred. After 6 hours the reaction is complete. When the white emulsion is left to itself for some length of time, it separates into layers. The bottom layer, which contains the alcoholate, is agitated with 2 x 250 ml. of methylcyclohexane and then evaporated under vacuum, to leave behind 45 grams of a yellow, honey-like product which is the tantalum pentaalcoholate of ethylenechlorohydrin.

(b) 8 grams of the metal alcoholate obtained under (a) above are added to 200 ml. of a mixture of aliphatic hydrocarbons boiling between 180 and 200° C. contained in a flask of 500 ml. capacity, and 150 ml. of liquid ethylene oxide are then added at 15° C. The reaction mixture is kept at 15° C. When first inspected after 4 days it is found that a white, crystalline substance has formed which, on recrystallization from acetone+ether, reveals the following analytical data: C, 53.3%; H, 8.9%; Cl, 0.4%; O, 37.4%, corresponding to the empirical formula $(C_2H_4O)_{222}Cl$.

Thus, assuming that each chain of the resulting polymer contains one atom of chlorine, the molecular weight is about 10,000. The resulting product has a melting point of 58–60° C.

*Example 2*

Mixtures of 6 grams of ethylene oxide with the following products were kept in each case in fused glass tubes at 20° C:

|   |   | Grams |
|---|---|---|
| (a) | $Ta(OC_2H_4Cl)_5$ | 1.25 |
| (b) | $Ta(OC_2H_4Cl)_5$ | 5.0 |
| (c) | $Ta(OC_2H_5)_5$ | 0.5 |

The alcoholates dissolved rapidly in the ethylene oxide.

When first inspected after 3 hours, the substance in tube (a) was found to have turned highly viscous and on further inspection 6 hours after the start of the reaction it had solidified to form a white, crystalline mass.

The substance in tube (b), on first inspection after 4 hours, was found to have solidified to a white, crystalline mass.

The substance in tube (c), on being inspected after 6 hours, displayed an increased viscosity and on second inspection after 93 hours it was found to have solidified to a white, crystalline mass.

*Example 3*

A sulfonating flask of 1.5 liter capacity, equipped with a magnet stirrer and a reflux condenser, operated with ice water, is charged with 500 ml. of anhydrous benzene and an alcoholate prepared as described in Example 1(a) from 5 grams of tantalum pentachloride and excess ethylene oxide. Gaseous ethylene oxide is then injected into the solution having a temperature of 30 to 40° C. The injection is performed at a rate such that no, or only very little, refluxing takes place. During the reaction the temperature must be raised to about 50° C. to reduce the viscosity of the solution and to prevent crystallization. After 12 hours 620 grams of ethylene oxide have undergone reaction. The viscous reaction mixture is then poured into 4 liters of acetone. Overnight 147 grams of a snow-white, crystalline product form. Another 430 grams of crystalline product can be obtained by concentrating the volume of solution by half and pouring in 500 ml. of ether. 100 grams of the product are once more dissolved in acetone. Addition of 5 ml. of concentrated ammonia precipitates and thus removes the small amount of tantalum incorporated in the polymer. When the solution is concentrated and ether is added, the product crystallizes out in a yield of about 93%.

Analysis: C, 54.33; H, 9.00; Cl, 0.4; O, 36.20%.

Viscosity ($\eta$) in benzene: $2 \times 5 \times 10^{-2}$ l./g. Melting point: 58–60° C.

*Example 4*

The apparatus described in Example 3 is charged with 10 ml. of tantalum pentaethylate in 500 ml. of anhydrous benzene. In the course of 20 hours 730 grams of gaseous ethylene oxide are then injected into the solution having a temperature of 30 to 40° C. Working up according to Example 3 produces 673 grams of a white polyethylene oxide in a yield of about 92%.

*Example 5*

10 ml. of liquid ethylene oxide each, admixed with under-mentioned amounts of catalyst, are fused in glass tubes and polymerized under autogenous pressure by shaking on a heating bath maintained by a thermostat at 30° C.

(a) 200 mg. of tantalum ethylate,
(b) 80 mg. of aluminum ethylate,
(c) 80 mg. of aluminum ethylate, and 10 mg. of zinc chloride,
(d) 200 mg. of tantalum phenolate.

After 5 hours the specimens are inspected. Specimen (d) has turned into a solid white, crystalline substance, while no change is observed in the others. After another 17 hours, specimen (a) has likewise solidified while specimen (c) is slightly more viscous, and specimen (b) remains unchanged.

*Example 6*

10 grams each of ethylene oxide and the following amounts of tantalum pentaphenolate are fused in glass tubes:

(a) 50 mg.
(b) 100 mg.
(c) 200 mg.
(d) 400 mg.

The specimens are first maintained for 5 hours at 30° C. while being agitated and then heated for 8 hours at 70° C. The tubes are then broken and their contents dissolved in acetone. On addition of ammonia the tantalum is precipitated and then filtered off. The solutions are then evaporated to determine the yields and viscosities. Results:

| Test | Polymer, grams | η spec. concentration, liter/gram |
| --- | --- | --- |
| (a) | 2.8 | $7.00 \times 10^{-2}$ |
| (b) | 8.4 | $3.37 \times 10^{-2}$ |
| (c) | 10.0 | $3.05 \times 10^{-2}$ |
| (d) | 9.8 | $2.02 \times 10^{-2}$ |

*Example 7*

10 ml. each of ethylene oxide (which has first been rendered completely anhydrous by refluxing it for 60 minutes over calcium hydride and then directly distilled into the glass tubes) are mixed with 400 mg. (=0.62 millimol) of tantalum pentaphenolate.

Different proportions of water in the form of an aqueous dioxane solution are then added, and all tubes are adjusted with pure dioxane to the same total content of dioxane (0.04 ml.). The tubes are fused and shaken in a heating bath maintained at 30° C.

| Millimol of water | Inspection after— | | |
| --- | --- | --- | --- |
| | 2 hours | 3 hours | 4½ hours |
| 0.31 | No change | No change | Viscous. |
| 0.46 | Viscous | Solid | Solid. |
| 0.62 | Solid | do | Do. |
| | Highly viscous | do | Do. |

*Example 8*

17 ml. of the tantalum chloralcoholate prepared as described in Example 1 are dissolved in 300 ml. of anhydrous tetrahydrofuran and 600 grams of ethylene oxide are then stirred in within 24 hours, while maintaining the temperature at 32 to 40° C. The apparatus used is the one described in Example 3. The solution turns increasingly more viscous and some time after completion of the reaction the product crystallizes out. Vacuum drying yields 557 grams of a crystalline polyethylene oxide which is freed from its inorganic by-products in the manner described above.

The elementary analysis reveals the following values:

|  | Percent |
| --- | --- |
| C | 54.06 |
| H | 8.97 |
| Cl | 1.23 |
| O (difference) | 35.74 |

C:H:Cl:O=2.02:4.02:0.016:1. As revealed by the chlorine content the polymerization degree is 63 (molecular weight: 2750).

The elementary analysis reveals that no appreciable amount of tetrahydrofuran has participated in the reaction.

*Example 9*

5 ml. of tantalum pentaethylate are dissolved in 300 ml. of propylene oxide in the apparatus described in Example 3.

400 grams of gaseous ethylene oxide are injected in the course of 30 hours, while maintaining the temperature at 30° C. by means of a heating bath. When the ethylene oxide has been added on, the batch is maintained for another 16 hours at 30° C. and then evaporated, to yield 330 grams of an oil. It is taken up in acetone, the inorganic matter is precipitated and the solution is once more evaporated and then dried; the product shows according to Rast's test a molecular weight of 730 and has the following elementary composition:

|  | Percent |
| --- | --- |
| C | 58.94 |
| H | 9.27 |
| O | 29.99 |

These values suggest that the product is made up of 42% by weight of ethylene oxide and 58% by weight of propylene oxide. The product is still soluble in water.

*Example 10*

10 ml. of cyclohexene oxide each with different amounts of tantalum phenolate and ethylate respectively are fused in glass tubes and heated for 5½ hours at 60° C. and then for 8 hours at 100° C.

| Catalyst, mg. | Yield, grams | Aspect | Viscosity spec. concentration, liter/gram |
| --- | --- | --- | --- |
| Ta-phenolate, 100 | 7.1 | Solid, white | |
| Ta-phenolate, 50 | 7.0 | do | $0.96 \times 10^{-2}$ |
| Ta-phenolate, 25 | 7.1 | Rubber-like, white | |
| Ta-chlorethylate, 100 | 6.6 | Solid, yellowish | |
| Ta-ethylate, 50 | 6.4 | Highly viscous oil | |

*Example 11*

In a first test 20 grams each of propylene oxide are fused in a glass tube with 0.5 gram of tantalum penta(2-chlorethylate) and 0.5 gram of tantalum penta(2-bromethylate) and heated to 80° C. After 144 hours the specimens are inspected. They have undergone polymerization to form highly viscous oils which are soluble in toluene.

In a second test the following specimens are fused in reaction tubes and polymerized at 80° C.

10 ml. of propylene oxide each, with (a) 80 mg. of aluminum ethylate,
(b) 200 mg. of tantalum ethylate and 20 mg. of aluminum ethylate,
(c) 200 mg. of tantalum ethylate and 80 mg. of aluminum ethylate,
(d) 50 mg. of tantalum ethylate and 80 mg. of aluminum ethylate.

After 15 hours the specimens (b) and (d) have become highly viscous, specimen (c) was found to have become solid, and (a) had remained substantially unchanged.

*Example 12*

6 grams of tantalum pentachloride are suspended in 500 ml. of anhydrous benzene in a sulfonating flask of 1.5 liter capacity, equipped with a magnet stirrer and a reflux condenser and operater with ice water. Gaseous ethylene oxide is then injected at 10 to 20° C.; the initially brown-orange coloration of the suspension disappears gradually and all tantalum pentachloride passes into solution. Ethylene oxide is further injected into this clear, colorless solution at a rate such that only little refluxing takes place. The temperature rises gradually to approximately 40° C., and is kept constant by suitably adjusting the supply of ethylene oxide. Taking into consideration the increasing viscosity the temperature must subsequently be raised to 50° C. In the course of 12 hours a total of 590 grams of ethylene oxide is added. The viscous solution is then worked up as described in Example 3. The product (530 grams) has properties similar to those described in Example 3.

*Example 13*

Mixtures of 10 ml. of liquid ethylene oxide each with the following amounts of tantalum penta-tertiary butylate are fused in glass tubes.

| | Mg. |
|---|---|
| No. 1 | 340 |
| No. 2 | 136 |
| No. 3 | 68 |
| No. 4 | 34 |
| No. 5 | 17 |

The tubes are then kept in a heating bath maintained at 30° C. while being vigorously agitated.

Tube No. 1 solidifies after 1 hour and tube No. 2 after 4 hours to form a crystalline, white substance. The other specimens display a distinct increase in viscosity and on inspection after 2 days they too are found to have solidified. Tube No. 5 is heated for another 8 hours at 80° C., whereupon the content melts and undergoes complete polymerization; the polymer is then dissolved in water, and the solution is freed from the precipitated hydrated tantalum oxide and evaporated. The resulting product (9.2 grams) can be cast to form tough filaments and foils. Its specific viscosity is $11.0 \times 10^{-2}$ (liter/gram).

*Example 14*

420 mg. of tantalum cyclohexanolate are reacted with 10 ml. of liquid ethylene oxide in a fused tube at 30° C.

After 6½ hours the content has undergone polymerization to form a solid, white product.

*Example 15*

A mixture of 10 ml. of styrene oxide and 10 mg. of tantalum phenolate is fused in a glass tube and heated for 26 hours at 25° C. The styrene oxide undergoes polymerization to form a yellowish viscid substance.

What is claimed is:
1. A process for the preparation of a high molecular polyalkylene oxide by catalytic polymerization of a saturated 1,2-epoxide, comprising contacting as the sole reactive ingredient a 1,2-epoxide of the formula

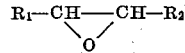

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms and together with the epoxy carbon atoms represent a saturated cycloaliphatic hydrocarbon radical containing 5 to 10 carbon atoms, with a tantalum compound selected from the group consisting of tantalum alcoholates from monohydric alcohols containing 1 to 18 carbon atoms and tantalum phenolates from phenols containing 6 to 10 carbon atoms, which tantalum compound is present in an amount of 0.01 to 20 percent by weight calculated on the total weight of the 1,2-epoxide, at a temperature ranging from 0 to 150° C. and in the presence of at most autogenous pressure for a period of time sufficient to produce a polymer.

2. A process for the preparation of a high molecular polyalkylene oxide by catalytic polymerization of a saturated 1,2-epoxide, comprising contacting ethylene oxide with a tantalum compound of the general formula

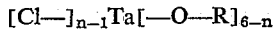

in which $n$ is an integer from 1 to 5 and R represents a hydrocarbon radical selected from the group consisting of alkyl having 1 to 18 carbon atoms, aryl having 6 to 10 carbon atoms and mixtures thereof, which tantalum compound is present in an amount of 0.01 to 20 percent by weight calculated on the total weight of the 1,2-epoxide, at a temperature ranging from 0 to 150° C. and in the presence of at most autogenous pressure for a period of time sufficient to produce a polymer.

3. A process for the preparation of a high molecular polyalkylene oxide by catalytic polymerization of a saturated 1,2-epoxide, comprising contacting propylene oxide with a tantalum compound of the general formula

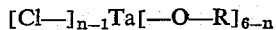

in which $n$ is an integer from 1 to 5 and R represents a hydrocarbon radical selected from the group consisting of alkyl having 1 to 18 carbon atoms, aryl having 6 to 10 carbon atoms and mixtures thereof, which tantalum compound is present in an amount of 0.01 to 20 percent by weight calculated on the total weight of the 1,2-epoxide, at a temperature ranging from 0 to 150° C. and in the presence of at most autogenous pressure for a period of time sufficient to produce a polymer.

4. A process for the preparation of a high molecular polyalkylene oxide by catalytic polymerization of a saturated 1,2-epoxide, comprising contacting as the sole reactive ingredient a 1,2-epoxide of the formula

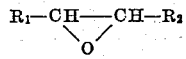

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms, and together with the epoxy carbon atoms represent a saturated cycloaliphatic hydrocarbon radical containing 5 to 10 carbon atoms, with $Ta(OCH_2CH_2Cl)_5$, which is present in an amount of 0.01 to 20 percent by weight calculated on the total of the 1,2-epoxide, at a temperature ranging from 0 to 150° C. and in the presence of at most autogenous pressure for a period of time sufficient to produce a polymer.

5. A process for the preparation of a high molecular polyalkylene oxide by catalytic polymerization of a saturated 1,2-epoxide, comprising contacting as the sole reactive ingredient a 1,2-epoxide of the formula

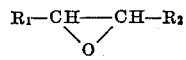

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms and together with the epoxy carbon atoms represent a saturated cycloaliphatic hydrocarbon radical containing 5 to 10 carbon atoms, with

which is present in an amont of 0.01 to 20 percent by weight calculated on the total of the 1,2-epoxide at a temperature ranging from 0 to 150° C. and in the presence of at most autogenous pressure for a period of time sufficient to produce a polymer.

6. A process for the preparation of a high molecular polyalkylene oxide by catalytic polymerization of a saturated 1,2-epoxide, comprising contacting as the sole reactive ingredient a 1,2-epoxide of the formula

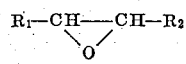

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms and together with the epoxy carbon atoms represent a saturated cycloaliphatic hydrocarbon radical containing 5 to 10 carbon atoms, with $Ta(OC[CH_3]_3)_5$, which is present in an amount of 0.01 to 20 percent by weight calculated on the total of the 1,2-epoxide, at a temperature ranging from 0 to 150° C. and in the presence of at most autogenous pressure for a period of time sufficient to produce a polymer.

7. A process for the preparation of a high molecular polyalkylene oxide by catalytic polymerization of a saturated 1,2-epoxide, comprising contacting as the sole reactive ingredient a 1,2-epoxide of the formula

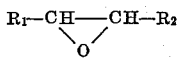

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms and together with the epoxy carbon atoms represent a saturated cycloaliphatic hydrocarbon radical containing 5 to 10 carbon atoms, with $Ta(OC_6H_5)_5$, which is present in an amount of 0.01 to 20 percent by weight calculated on the total of the 1,2-epoxide, at a temperature ranging from 0 to 150° C. and in the presence of at most autogenous pressure for a period of time sufficient to produce a polymer.

8. A process for the preparation of a high molecular polyalkylene oxide by catalytic polymerization of a saturated 1,2-epoxide, comprising contacting as the sole reactive ingredient a 1,2-epoxide of the formula

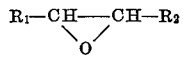

in which $R_1$ and $R_2$ each is selected from the group consisting of hydrogen, halogen-substituted saturated hydrocarbon radical of 1 to 12 carbon atoms, and saturated hydrocarbon radical of 1 to 12 carbon atoms and together with the epoxy carbon atoms represent a saturated cycloaliphatic hydrocarbon radical containing 5 to 10 carbon atoms, with $Ta(OC_6H_5)_5$, which is present in an amount of 0.01 to 20 percent by weight calculated on the total of the 1,2-epoxide, at a temperature ranging from 0 to 150° C. and in the presence of at most autogenous pressure and of up to 1 molecular proportion of water per molecular proportion of tantalum phenolate, for a period of time sufficient to produce a polymer.

References Cited by the Examiner
UNITED STATES PATENTS

| | | | |
|---|---|---|---|
| 2,870,099 | 1/1959 | Borrows et al. | 260 |
| 2,870,100 | 1/1959 | Stewart et al. | 260 |
| 2,882,264 | 4/1959 | Barnes et al. | 260 |
| 2,956,959 | 10/1960 | Detter | 260 |

WILLIAM H. SHORT, *Primary Examiner.*

JOSEPH L. SCHOFER, *Examiner.*

R. A. BURROUGHS, T. PERTILLA,
*Assistant Examiners.*